United States Patent
Roy (10) Patent No.: US 7,535,843 B2
(45) Date of Patent: May 19, 2009

(54) METHOD, APPARATUS AND SYSTEM FOR GRANULAR POLICING BASED ON MULTIPLE ARRIVAL CURVES

(75) Inventor: Anindya Roy, Lowell, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 609 days.

(21) Appl. No.: 11/027,297

(22) Filed: Dec. 30, 2004

(65) Prior Publication Data

US 2006/0146710 A1    Jul. 6, 2006

(51) Int. Cl.
*H04L 12/26*   (2006.01)
(52) U.S. Cl. .................................... 370/235
(58) Field of Classification Search ............... 370/235
See application file for complete search history.

(56) References Cited

U.S. PATENT DOCUMENTS

| | | | | |
|---|---|---|---|---|
| 5,764,641 A | * | 6/1998 | Lin | ............................ 370/412 |
| 6,247,061 B1 | * | 6/2001 | Douceur et al. | ............. 709/240 |
| 6,882,642 B1 | * | 4/2005 | Kejriwal et al. | ............. 370/388 |
| 6,907,003 B1 | * | 6/2005 | Gvozdanovic | .............. 370/232 |
| 7,149,187 B1 | * | 12/2006 | Jacobson et al. | ............ 370/235 |
| 2002/0110134 A1 | * | 8/2002 | Gracon et al. | ............... 370/412 |

\* cited by examiner

*Primary Examiner*—Chi H Pham
*Assistant Examiner*—Mohammad S Adhami

(57) ABSTRACT

A method for granular policing includes a novel policing architecture which evaluates an arriving cell's conformance by comparing the actual arrival characteristic against a family or a set of expected arrival curves. In embodiments of the present invention, expected arrival characteristics based on a connection service level agreement (SLA) are represented by a family of N arrival curves. The degree of non-conformance of a cell is evaluated by inspecting, which m arrival curves were violated and which N-m arrival curves were non-violated by the arriving cells. Subsequently in context of discard, non-conforming tagged cells are further prioritized based on their degree of non-conformance. Thus cells associated with a higher degree of non-conformance shall be discarded before cells with a relatively lower degree of non-conformance.

13 Claims, 7 Drawing Sheets

(a)

(b)

TAT: THEORETICAL ARRIVAL TIME
ta(k): ACTUAL ARRIVAL TIME OF $k^{th}$ CELL
I : INCREMENT i.e., INTER-CELL TIME
L : LIMIT

METHOD, APPARATUS AND SYSTEM FOR GRANULAR POLICING BASED ON MULTIPLE ARRIVAL CURVES

FIELD OF THE INVENTION

The present invention relates to connection-oriented packet switched networks and, more specifically, to a method for traffic management in such networks using granular policing.

BACKGROUND OF THE INVENTION

A traffic flow is an abstraction of an end to end or an intermediate network overlay that can be provisioned, managed or regulated by means of traffic engineering techniques and monitored. A flow is identified based on some sort of classification. Classification parameters may be a set of or single individual parameter(s) such as destination address, service class etc. A flow may be an aggregate of multiple sub flows with common classification parameters as applied in a Differentiated Service model (a.k.a Diff-Serv) or a sub-flow as applied in an Integrated Service model. Congestion control is important to ensure fair resource allocation is always maintained across multiple traffic flows or virtual connections sharing common network resources such as port, bandwidth, buffer, etc., and to safeguard connection service level agreements (SLAs) for flows against unpredictable network dynamics caused due to non-Gaussian traffic loads incident at the provisioned network flow or transient overloading across the network node resources. Congestion control may be applied during the setup or provisioning of a network flow by using Connection or Call Admission Procedures (CAC) and also during actual traffic flow by regulating traffic entering at the ingress of a flow and leaving the egress of a node. CAC involves carefully allocating required network resources after factoring the SLA specification for that flow and examining available resources.

At the packet or cell level, congestion avoidance is achieved by using Metering or Policing or Usage Parameter control (UPC) at the network ingress and by using Flow Control Procedures (FCP) at the network node egress. User Traffic enters at the network node ingress and is switched out of the node to the next hop node via an egress (i.e. exit) point. UPC is typically applied at the ingress of the flow or overlay to ensure that incident traffic load does not exceed a negotiated traffic contract. Traffic meters or policers measure the temporal or transient properties of the stream of packets or cells selected by a classifier against a traffic profile specified in a target channel adapter (TCA). A meter passes state information to other conditioning functions to trigger a particular action for each packet or cell that is either in- or out-of-profile (to some extent). Thus the policing function is the process of measuring the temporal properties (e.g., cell rate or packet rate) of a traffic stream selected by a classifier. The instantaneous state of this process may be used to affect the operation of a marker, shaper, or dropper, and/or may be used for accounting and measurement purposes.

Policing or Metering functionality may be applied to ATM cell based virtual connections (VCs), MPLS packet based Layer 2 Virtual Private Networks (VPNs) or Pseudowires, MPLS tunnels such as MPLS EXP-bit inferred Label Switched Paths (E-LSPs) and Label inferred LSPs (L-LSPs), Ethernet based Virtual Large Area Networks (IEEE 802.1 q based VLANs) etc. Metering or Policing regulates any provisioned flow by carefully discarding or tagging incoming packets or cells. Tagging is the process of raising the packet or cell loss priority parameter value that is usually embedded in each packet or cell. In an ATM network, metering is known as UPC or network parameter control (NPC). Connection monitoring at a user-network interface (UNI) (private or public) is referred to as UPC. Connection monitoring at a network-network interface (NNI) (private or public) is referred to as NPC. Connection monitoring encompasses all connections crossing the interface where UPC is used. UPC applies to both user connections and signaling channels.

Existing policers, however, lack the ability to make granular policing decisions. Typically, existing policing algorithms make their policing decisions based on expected packet arrival time and a single tolerance threshold, which defines an additional early arrival margin for the flow. If a packet or cell arrives earlier than the expected arrival time, but still within the early arrival margin tolerance then the packet will be considered conforming. The actual cell time of the cell arriving at the connection ingress is compared against the theoretical or expected arrival cell time computed as per the connection's SLA, to identify if the incident cell is conforming or non-conforming. More specifically, typically each packet quanta or cell is associated with a theoretical arrival time and an early arrival limit, wherein a difference of the early arrival limit from the theoretical arrival time delineates a lower boundary of a good zone. Even further, in various existing policers, the theoretical arrival time minus the sum of the early arrival limit and the nominal inter-cell arrival rate increment delineates an upper boundary of the good zone. The existing methods further include determining an actual arrival time for an incoming cell from the cells that make up the virtual connection. Subsequently, the actual arrival time is compared to the upper boundary and the lower boundary to determine whether or not the actual arrival time falls within the good zone. In response to determining that the actual arrival time falls within the good zone, the incoming cell is identified as conforming to the transmission control parameter. High priority cells identified by the policer to be non-conforming with respect to the specified connection SLA may be marked or tagged as lower priority cells or discarded, while lower priority cells found to be non-conforming are discarded. Higher priority cells tagged as lower priority cells may be subjected to subsequent discard at that very network node egress if that egress is under a traffic overloaded condition.

As evident from the description above, the current approaches make their decisions based on a single arrival curve. In order to analyze the limitation of the current approach, consider the following example: Suppose an expected arrival time for a cell is T for a given connection as per its SLA, and the cell delay variation tolerance (CDVT) is $\partial L$. Assume now that a higher priority cell (denoted by C1) arrives at time (T-$\partial L1$) while another cell (denoted as C2) arrives at time (T-$\partial L2$), where ($\partial L\ 1 > \partial L2 > \partial L$, $\partial L > 0$). Based on the current approach both the cells (C1, C2) shall be marked or tagged to a lower priority as both the cells have arrived earlier than the maximum permissible early arrival time of (T-$\partial L$). Thus, the fact that C1 violated the SLA contract by a larger factor, $\partial L1$, than C2, which violated the contract by a relatively smaller factor, $\partial L2$, was not accounted in the tagging process. Thus, under traffic overloaded conditions that may trigger discard of lower priority cells and both C1 and C2 may be subject to discard. Ideally C2 should have had a lower discard preference over C1 based on their actual arrival characteristics as indicated above. However with the currently existing mechanisms, policers are unable to make such granular policing decisions.

SUMMARY OF THE INVENTION

The present invention addresses the deficiencies of the prior art by providing a novel policing method and architecture which evaluates an arriving cell's conformance by comparing the actual arrival characteristic against a family or a set of expected arrival curves. In the present invention, expected arrival characteristics based on a connection service level agreement (SLA) are represented by a family of ordered N arrival curves. The degree of non-conformance of an incoming packet or cell is evaluated by inspecting, which m arrival curves were violated and which N-m arrival curves were non-violated by the arriving cells. If for an incoming packet or cell m is found to be zero, then the cell is considered conforming. If m is non-zero, it is evident that the incoming packet in context has violated m arrival curves. Such a packet or cell shall be admitted, but its incident arrival characteristic or degree of non-conformance is recorded and stored in the internal packet header. Internal packet header is hardware/software dependent implementation specific information used for routing and traffic engineering a flow with a node or switch or router. Subsequently in context of discard, non-conforming tagged packets or cells are further prioritized based on their degree of non-conformance. Thus packets or cells associated with a higher degree of non-conformance shall be discarded before packets cells with a relatively lower degree of non-conformance.

In one embodiment of the present invention a method for enforcing a transmission control parameter for a virtual connection including multiple cells within an input port, the virtual connection having a nominal inter-cell arrival rate increment, wherein the multiple cells are associated with a theoretical arrival time and an early arrival limit, includes delineating a lower boundary of a conformance zone by determining a difference between the early arrival limit and the theoretical arrival time, defining at least one early arrival curve below the lower boundary of the conformance zone, determining an actual arrival time for an incoming cell from the multiple cells, and comparing the actual arrival time to the lower boundary to determine whether or not the actual arrival time is later than the lower boundary of said conformance zone. In this embodiment of a method of the present invention, in response to determining that the actual arrival time is later than the lower boundary of the conformance zone, the incoming cell is identified as conforming to the transmission control parameter. However, in response to determining that the actual arrival time is earlier than the lower boundary of the conformance zone, the incoming cell is identified as non-conforming to the transmission control parameter and the incoming cell is prioritized using the defined at least one early arrival curve.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method, apparatus and system for enforcing a transmission control parameter for a virtual connection including multiple cells within an input port, the virtual connection having a nominal inter-cell arrival rate increment, where the multiple cells are associated with a theoretical arrival time and an early arrival limit. Although various embodiments of the present invention are described herein with respect to a connection-oriented, cell-based ATM network, the specific embodiments of the present invention should not be treated as limiting the scope of the invention. It will be appreciated by those skilled in the art and informed by the teachings of the present invention that the concepts of the present invention may be applied in substantially any other connection-oriented, packet-based networks for granular policing of arriving cells to determine conformity. It should also be noted that although various embodiments of the present invention are described herein with respect to data cells, the terms data cell, cell, packets and data packets are used interchangeably throughout the present disclosure and it should be considered that the concepts of the present invention apply to all equally.

Figure 1:
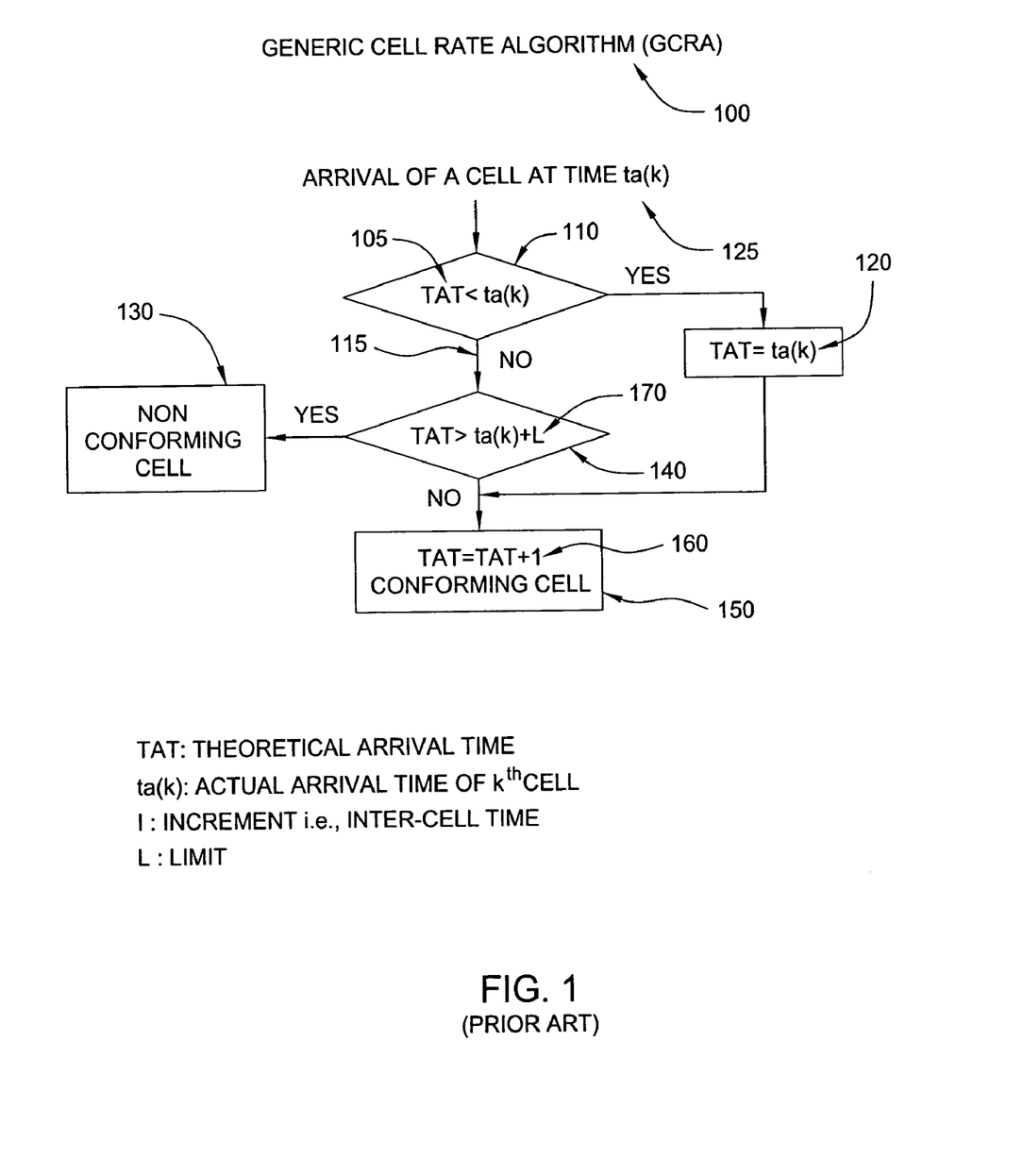
FIG. 1 depicts a high level block diagram of a generic cell rate algorithm (GCRA)

FIG. 1 depicts a high level block diagram of a generic cell rate algorithm (GCRA) 100 that may be implemented in conventional ATM networks for policing all arriving cells to determine if the cells conform 150 or if they do not conform 130. A policing policy, such as the ATM policing algorithm 100 of FIG. 1, is typically run twice. The policing algorithm is run first, to police PCR (peak cell rate) and second, to police sustainable cell rate (SCR). What occurs after the cells have thus been categorized is beyond the scope of the present invention and as such will not be described herein.

Generally speaking, conforming cells are normally accepted into the network while non-conforming cells may be disposed of immediately or tagged as candidates for later disposal in the event of network congestion. The present invention relates to policing incoming traffic, such as ATM traffic, for cells that are arriving through an input port of an ATM network switching node at high speeds, for example, of up to 2.4 Gigabits per second ($2.4 \times 10^9$ b/s).

Because many thousands of virtual connections must be supported at the input ports, each arriving cell must be first recognized as belonging to a particular virtual connection. After a cell has been identified as belonging to a particular virtual connection, the traffic parameters of the connection are retrieved. Specifically, an increment or inter-cell arrival time, I, 160 sets a nominal rate at which cells for this virtual connection are expected to arrive. Further, a tolerance limit, L, 170 is a parameter utilized to determine when early-arriving cells are declared non-conforming 130.

An actual arrival time of every cell ta(k) 125 is compared, as shown at step 110, to a theoretical arrival time or TAT 105. If, as depicted at step 120, ta(k) 125 is larger than TAT 105 (the $k^{th}$ cell arrives after the point in time defined by TAT 105), TAT is reset to equal ta(k), and the current cell ($k^{th}$ cell) is determined to be a conforming cell as illustrated at step 150. As further depicted at step 150, TAT of the next arriving cell ($k^{th}$+1), to be received for that virtual connection, is incremented 150 by the nominal inter-cell time value, I, 160. Thus, cells that arrive late with respect to their theoretical arrival time are always conforming, and TAT is then reset to the actual arrival time of the current cell.

If however, the result of the comparison shown at step 110 indicates that the arrival time of the $kt^{th}$ cell is earlier than nominally expected (i.e., ta(k) less than the current value of TAT) then, as depicted at step 140 a further test is performed. Current cell k is determined to conform if it does not arrive too early (i.e., stays within TAT minus L 170). As shown at step 140, the GCRA 100 performs this test by adding the limit, L, 170 to the actual arrival time ta(k) 125 before comparing to TAT 105. If the value of ta(k) is less than the value of (TAT-L), the $k^{th}$ cell is determined to be too early and thus non-conforming as shown at step 130. It is worth noting that this branch 115 of the algorithm does NOT reset TAT to the actual arrival time of the current cell. As depicted above, the prior art GCRA 100 of FIG. 1 expected arrival characteristics are based on a connection service level agreement (SLA) represented by a single arrival point (curve).

In contrast to the prior art GCRA 100 of FIG. 1, the inventor proposes herein a novel method, apparatus and architecture for granular policing of cell-based traffic based on a connection SLA represented by a family of N arrival curves, such that each curve is associated with some Cell Delay Variation Tolerance (CDVT), $k \times \partial L_i$, (k>0).

Figure 2:
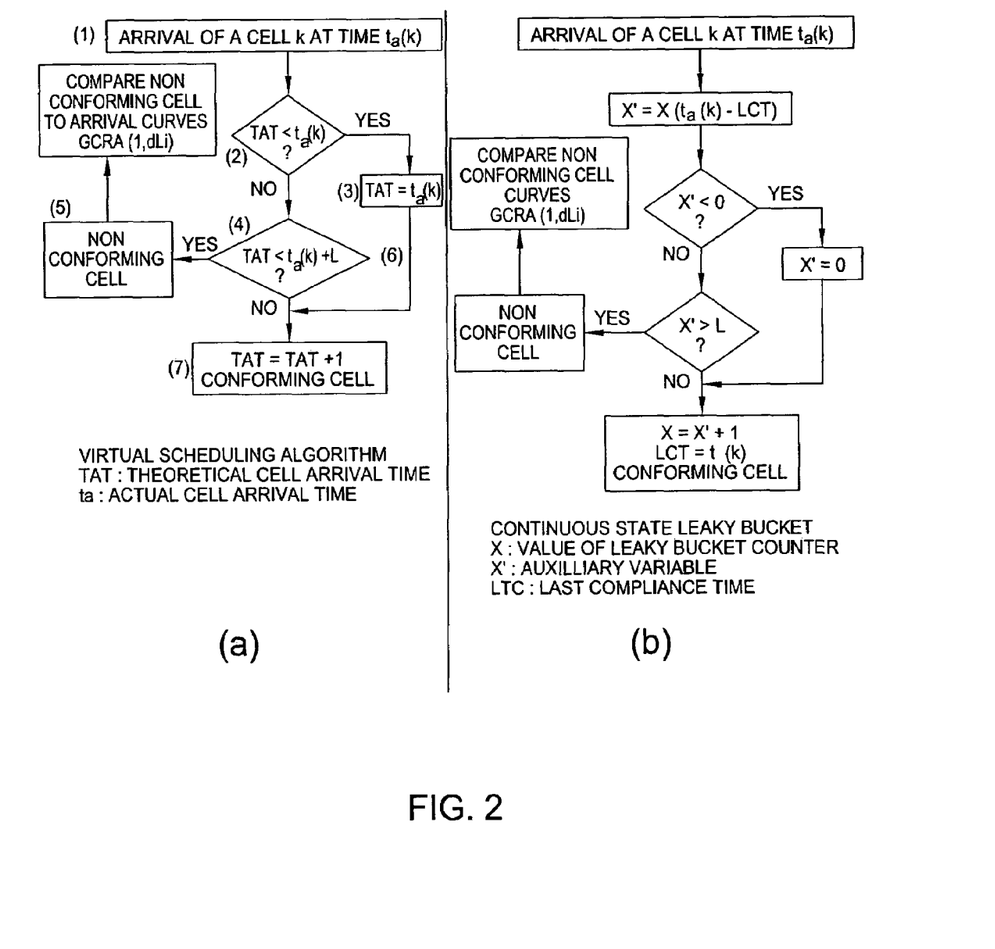
FIG. 2 depicts a high level block diagram of two generic cell rate algorithm (GCRA) methods in accordance with embodiments of the present invention.
Figure 3:
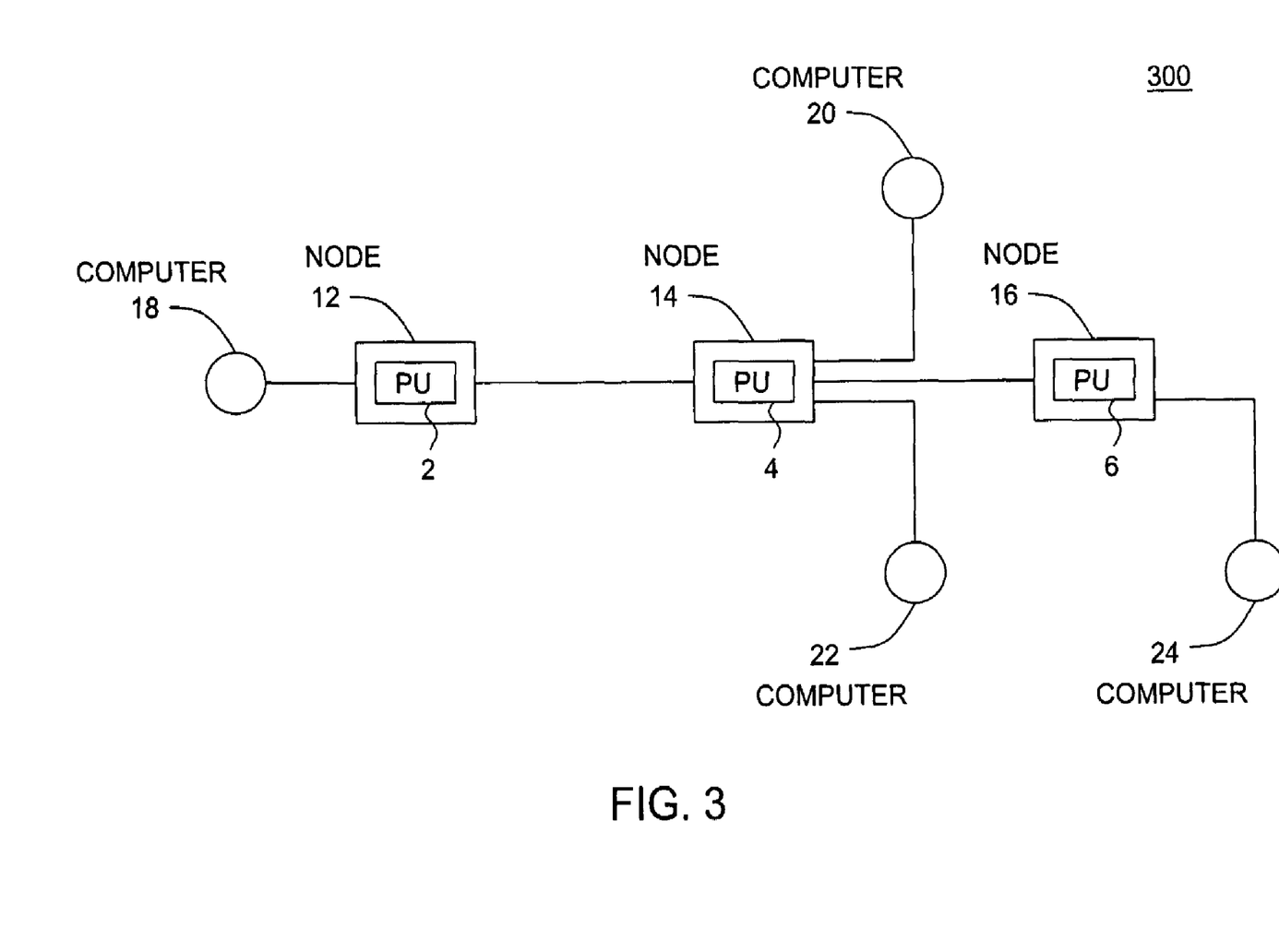
FIG. 3 depicts a simplified high level block diagram of a cell-based network, in which embodiments of the present invention may be applied.

FIG. 2 depicts a high level block diagram of two GCRA methods in accordance with embodiments of the present invention. The GCRA 200 of FIG. 2 may be implemented in cell-based networks such as conventional ATM networks for policing all arriving cells. For example, FIG. 3 depicts a simplified high level block diagram of a cell-based network, in which embodiments of the present invention may be applied. In the cell-based network 300 of FIG. 3, a set of network nodes (e.g., switches, routers, etc.) 12, 14, and 16 are connected in tandem to provide a network interconnecting various host computers 18, 20, 22, and 24 depicted as either the source or the destination. For example, a communication path from source computer 18 to destination 22 would traverse the path from an input port for switch 12, through that switch 12 to an output port, and then through a transmission line connection between switches 12 and 14 into an input port of switch 14. After going through switch 14 to one of its output ports, it would reach, through a transmission line, the destination computer 22. In the cell-based network 300 of FIG. 3, each node is responsible for processing the flow.

In such networks, at the cell level, congestion avoidance is achieved by using Metering or Policing or Usage Parameter control (UPC) at the network node's ingress. Each of the network nodes 12, 14 and 16 of the cell-based network 300 of FIG. 3 comprises a respective processing unit 2, 4 and 6 for performing the functions of each node and for performing the policing methods of the present invention. For example, FIG. 4 depicts a high-level block diagram of one embodiment of a processing unit suitable for use in the network nodes of a cell-based network, such as the cell-based network 300 of FIG. 3.

Figure 4:
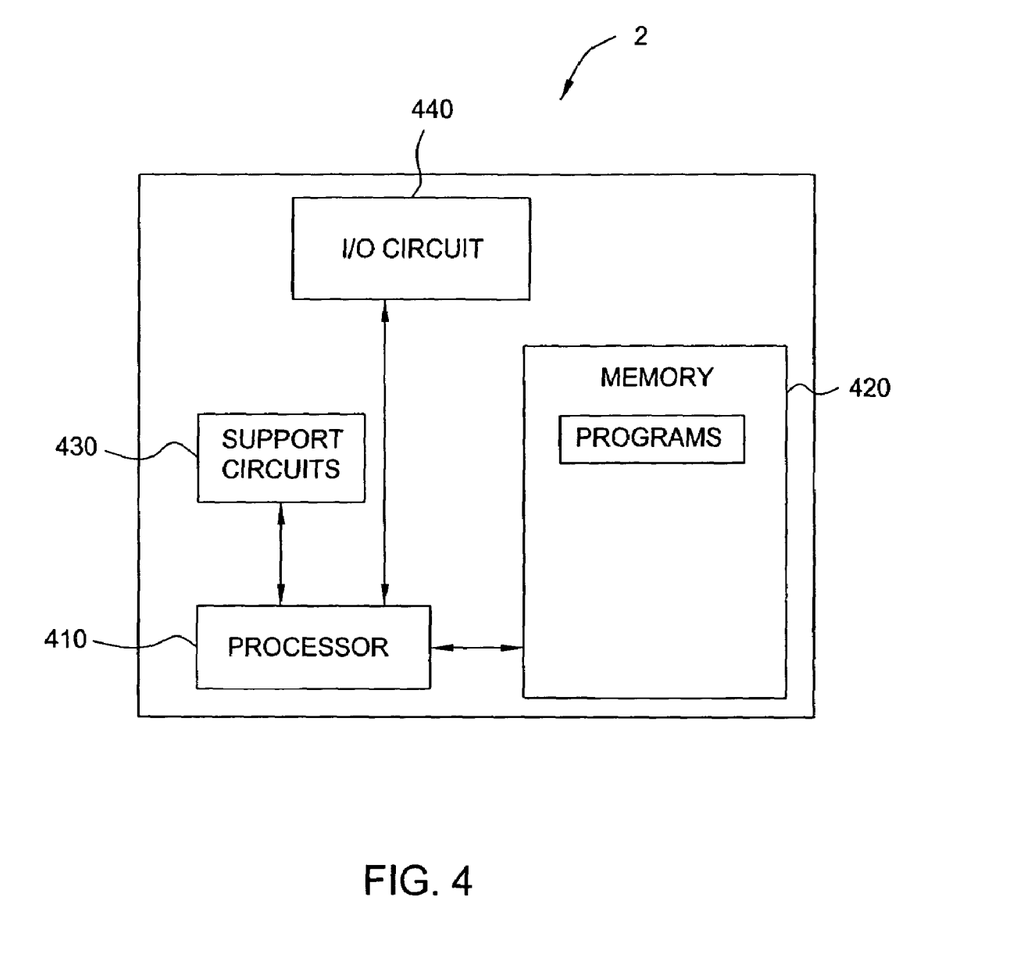
FIG. 4 depicts a high-level block diagram of an embodiment of a processing unit suitable for use in the network nodes of the cell-based network of FIG. 3.

The processing unit 2 of FIG. 4 comprises a processor 410 as well as a memory 420 for storing the algorithms and control programs. The processor 410 cooperates with conventional support circuitry 430 such as power supplies, clock circuits, cache memory and the like as well as circuits that assist in executing the software routines stored in the memory 420. As such, it is contemplated that some of the process steps discussed herein as software processes may be implemented within hardware, for example, as circuitry that cooperates with the processor 410 to perform various steps. The processing unit 2 also contains input-output circuitry 440 that forms an interface between the various functional elements communicating with the processing unit 2.

Although the processing unit 2 of FIG. 4 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof. As such, the methods of the present invention may be stored on a computer readable medium or carrier, e.g., RAM memory, magnetic or optical drive or diskette and the like.

Although in the cell-based network 300 of FIG. 3, each network node was depicted as comprising a respective processing unit, in alternate embodiments of the present invention, any combination of network nodes may share a processing unit or a single processing unit may be implemented for all of the network nodes.

As depicted in FIG. 2, embodiments of a GCRA of the present invention may comprise a virtual scheduling algorithm (FIG. 2a) or a continuous-state Leaky Bucket Algorithm (FIG. 2b). A GCRA of the present invention is used to define, in an operational manner, the relationship between PCR and the CDVT, and the relationship between SCR and the Burst Tolerance (BT). The BT can be derived from PCR, SCR, and MBS according to a Traffic Management Specification, such as version 4.0, Annex C.4.

That is, in the GCRA of FIG. 2, using the GCRA notations, a family of arrival curves in accordance an embodiment of the present invention is expressed as GCRA (I, $\partial L_i$), where $k \times \partial L_i$ represents different values for Cell Delay Variation Tolerance (CDVT). Thus, every arriving cell may be evaluated for arrival conformance against N arrival curves. As such, it is possible to evaluate the degree of non-conformance of cells by inspecting which arrival curves the cells violated and which arrival curves the cells did not violate. Thus when the cells are tagged as per conformance action taken by the policer, the degree of non-conformance is available at a per cell level, which may then be used to further prioritize the list of potential discard cell list. For example out of two non-conforming cells the degree of non-conformity is used to decide which cell among the two should be the first candidate for discard in the event the node has to discard cells from that flow due to congestion. Thus consider if both $C_J$ and $C_K$ are two non-conforming cells but $C_J$ conforms to arrival curve identified by CDVT $k1 \times \partial L_i$ represented as F ($k1 \times \partial L_i$) but violates arrival curve F ($k2 \times \partial L_i$), (where 0<k1<k2) while $C_K$ violates F ($k2 \times \partial L_i$) which means it has also violated F ($k1 \times \partial L_i$), as F ($k1 \times \partial L_i$) offers smaller tolerance or CDVT than F ($k2 \times \partial L_i$). In such a scenario $C_K$, in accordance with the present invention, is considered more non-conforming (misbehaving) then $C_J$, and thus, $C_K$ shall have a higher discard priority over $C_J$.

The GCRA methods of the present invention are characterized by an increment (I) and a limit (L). The increment denotes the average interarrival time between cells and is equivalent to the reciprocal of the SCR parameter in token bucket. The limit places a bound on the burstiness of the traffic. More specifically, FIG. 2a depicts a virtual scheduling method in accordance with an embodiment of the present invention and FIG. 2b depicts a continuous-state Leaky Bucket method in accordance with an alternate embodiment of the present invention.

In a GCRA in accordance with the present invention, TAT denotes the Theoretical Arrival Time of the next cell (i.e., the time when the next cell is expected to arrive). If the cell arrives after the TAT, then the cell is conforming, and the TAT is set to the arrival time of the cell+the increment (I). However, if the cell arrives before the TAT (i.e., the actual arrival time (ta) of the cell is less than TAT) then the actual arrival time (ta) of the cell must be examined to determine if the cell arrived within a limited allowable period before the TAT. This limited period is denoted by limit (L) and is known as Cell Delay Variation Tolerance (CDVT). If the TAT>ta+L then the cell is marked non-conforming and the TAT is left unchanged. If TAT<ta+L, the cell is marked conforming and TAT is incremented by the interval I.

More specifically, the virtual scheduling method of FIG. 2a updates a Theoretical Arrival Time (TAT), which is the "nominal" arrival time of the cell assuming that the active source sends equally spaced cells. If the actual arrival time of a cell is not "too" early relative to the TAT, in particular if the actual arrival time is after TAT−L, then the cell is conforming, otherwise the cell is non-conforming. That is, in the scheduling method of FIG. 2a, at the arrival time of a first cell ta(1), the theoretical arrival time TAT is initialized to the current time, ta(1). For subsequent cells, if the arrival time of the kth cell, ta(k), is actually after the current value of the TAT then the cell is conforming and TAT is updated to the current time ta(k), plus the increment, I.

However, if the arrival time of the kth cell is greater than or equal to TAT−L but less than TAT (i.e., if TAT is less than or equal to ta(k)+L), then again the cell is conforming, and the TAT is increased by the increment I. Lastly, if the arrival time of the kth cell is less than TAT−L (i.e., if TAT is greater than ta(k)+L), then the cell is non-conforming and the TAT is unchanged. In accordance with the present invention, the non-conforming cells are subsequently compared to the N arrival curves to prioritize the non-conforming tagged cells based on their degree of non-conformance.

In the continuous state leaky bucket method of FIG. 2b, a counter leaks from a bucket at each time unit. That is, the bucket initially holds 0 counters. The total capacity of the bucket is (L) which is the limit or CDVT. The arrival of a cell adds I counters to the leaky bucket. When a cell arrives, if the bucket has leaked enough so that the addition of I counters will not cause the bucket to overflow, then the cell is conforming, else the cell is non-conforming. The continuous-state leaky bucket algorithm of FIG. 2b can be viewed as a finite-capacity bucket whose real-valued content drains out at a continuous rate of 1 unit of content per time-unit and whose content is increased by the increment I for each conforming cell. Equivalently, it can be viewed as the work load in a finite-capacity queue or as a real-valued counter. If, at a cell arrival, the content of the bucket is less than or equal to the limit value, L, then the cell is conforming, otherwise the cell is non-conforming. The capacity of the bucket (the upper bound on the counter) is L+I.

More specifically, in the continuous-state Leaky Bucket method of FIG. 2b, at the arrival time of the first cell ta(1), the content of bucket, X, is set to zero and the last conformance time (LCT) is set to ta(1). At the arrival time of the kth cell, ta(k), first the content of the bucket is provisionally updated to the value X', which equals the content of the bucket, X, after the arrival of the last conforming cell minus the amount the bucket has drained since that arrival, where the content of the bucket is constrained to be non-negative. Second, if X' is less than or equal to the limit value L, then the cell is conforming, and the bucket content X is set to X' plus the increment I for the current cell, and the last conformance time LCT, is set to the current time ta(k). If, on the other hand, X' is greater than the limit value L, then the cell is non-conforming and the values of X and LCT are not changed. In accordance with the present invention, the non-conforming cells are subsequently compared to the N arrival curves to prioritize the non-conforming tagged cells based on their degree of non-conformance.

The two algorithms depicted in FIG. 2 above are substantially equivalent in the sense that for any sequence of cell arrival times, $\{ta(k), k>=1\}$, the two algorithms determine the same cells to be conforming and thus the same cells to be non-conforming. The two algorithms are easily compared by noticing that at each arrival epoch, ta(k), and after the algorithms have been executed, TAT=X+LCT, as depicted in FIG. 2.

Figure 5:
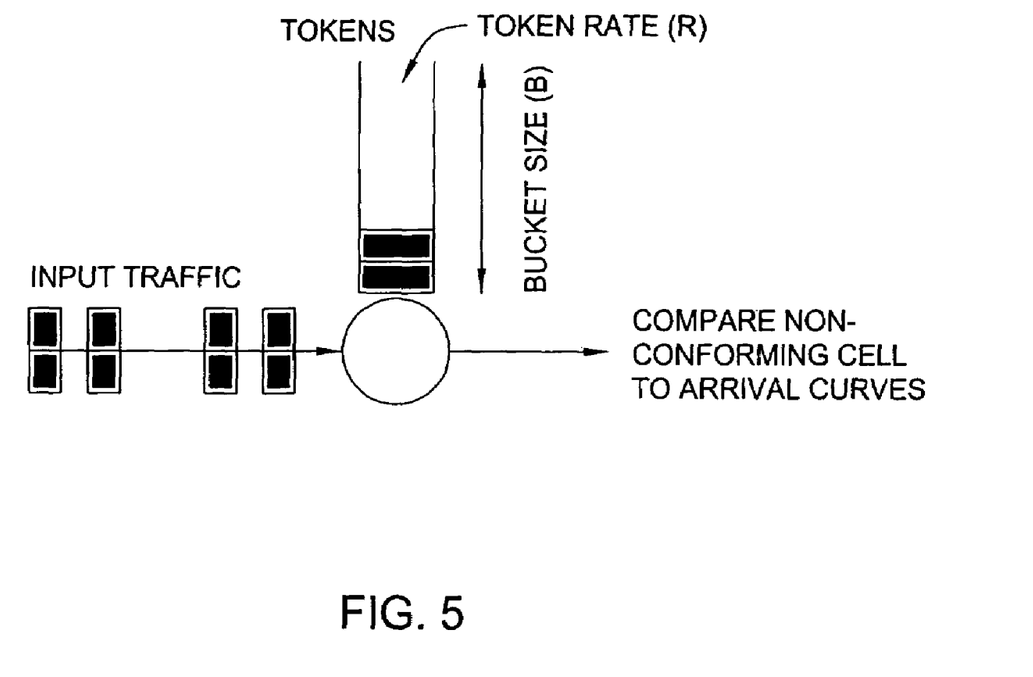
FIG. 5 depicts an alternate embodiment of a GCRA method of the present invention.

FIG. 5 depicts an alternate embodiment of a GCRA method of the present invention. In the token bucket GCRA method of FIG. 5, a token bucket is used to enforce SCR and maximum (MBS). The traffic consisting of cells enters a token bucket server as shown. Tokens enter the token bucket at a rate of R. That is, a token is placed in the bucket at the theoretical rate (expected time) of arriving cells. The bucket can hold at most B tokens. Each token corresponds to a single cell. When a cell arrives, if there is a token in the bucket, the token is removed and the cell is accepted as a conforming cell. If there is no token in the bucket, then the cell is a non-conforming cell, meaning that the cell is in violation of its traffic contract. Non-conforming cells can be tagged (treated as low priority), buffered (for later transmission) or simply discarded by the network. In accordance with the present invention, the non-conforming cells are subsequently compared to the N arrival curves to prioritize the non-conforming tagged cells based on their degree of non-conformance.

Although specific policing methods were described in FIG. 2 and FIG. 5 above, the application of the concepts of the present invention are not limited to those methods. It should be noted that the concepts of the present invention may be applied in substantially any policing methods for prioritizing non-conforming cells based on their degree of non-conformance.

Given a wide-sense increasing function, $\propto$, defined for $t \geq 0$, a flow R is constrained by $\propto$ if and only if for all $s \leq t$: $R(t)-R(s) \leq \propto(t-s)$. R has $\propto$ as an arrival curve and R is considered $\propto$-smooth. Traditional policing algorithms evaluate conformance of a flow, R by, examining the flow, R, against a single arrival curve, $\propto$. The curve, $\propto$, is derived based on theoretical arrival time of a flow and a tolerance period. The generic cell rate Algorithm with parameters $(T, \tau)$, GCRA $(T, \tau)$, is used with fixed size packets or cells (i.e., ATM networks where traffic arrives in fixed quanta of 53 bytes called ATM cells). The definition of quanta can be varied to extend the applicability of GCRA to other network flows as well (i.e., a quanta defined as 1 byte).

In the present invention, a granular policing decision is performed by examining a flow, R, for conformance by evaluating the flow against N arrival curves or a family of ordered $k\propto$ arrival curves, where k>0 and k is a real number. For a given flow whose conformance is evaluated by the policer, since the theoretical arrival time is fixed based on the specified Max and Min Cell/Packet Rate for the flow (e.g., PCR, SCR, BurstSize), each of the k∝ arrival curves varies from the other by a factor of tolerance (L) (i.e., in ATM, the CDVT).

Figure 6:
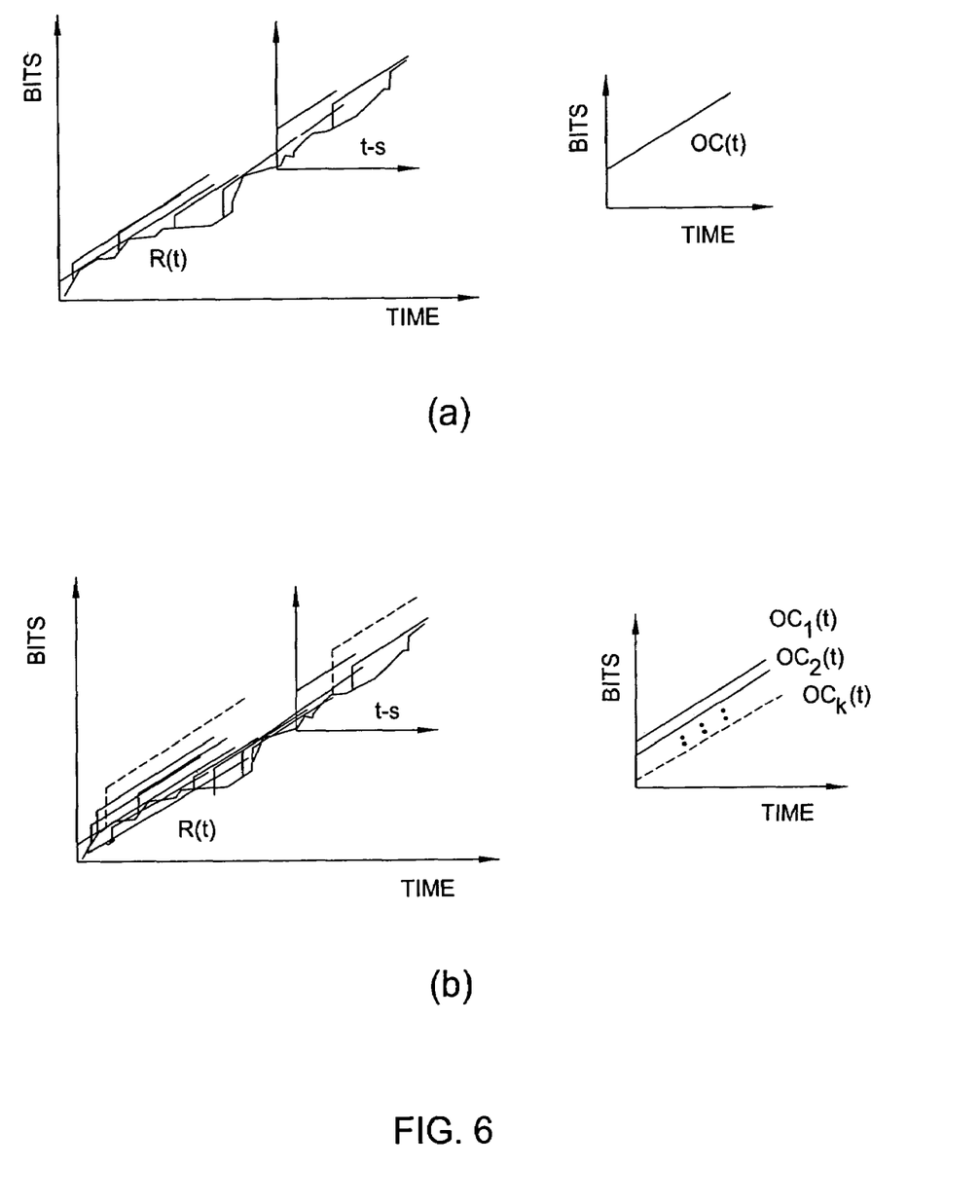
FIG. 6 graphically depicts a flow, R, constrained by single arrival curve as in typical existing policing methods and a flow constrained by multiple arrival curves for prioritizing non-conforming cells in accordance with an embodiment of the present invention.

FIG. 6 graphically depicts a flow, R, constrained by single arrival curve as in typical existing policing methods and a flow constrained by multiple arrival curves in accordance with an embodiment of the present invention. In FIG. 6, the arrival cells are graphed as a function of time. More specifically, FIG. 6a graphically depicts a cumulative flow function R(t) constrained by a single arrival curve ∝(t). As evident in FIG. 6a, arriving cells may only be defined as conforming or non-conforming depending on which side of the curve they appear.

FIG. 6b, however, graphically depicts a cumulative flow function R(t) constrained by a family of arrival cures, $\propto_1(t)$, $\propto_2(t) \ldots \propto_k(t)$, in accordance with an embodiment of the present invention. In the present invention as depicted in FIG. 6b, it is evident that arriving cells may also be defined as conforming or non-conforming, but the non-conforming cells may be further prioritized and ordered according to a degree of non-conformance using the family of arrival curves, $\propto_1(t)$, $\propto_2(t) \ldots \propto_k(t)$, in accordance with the embodiment of the present invention depicted in FIG. 6b.

Figure 7:
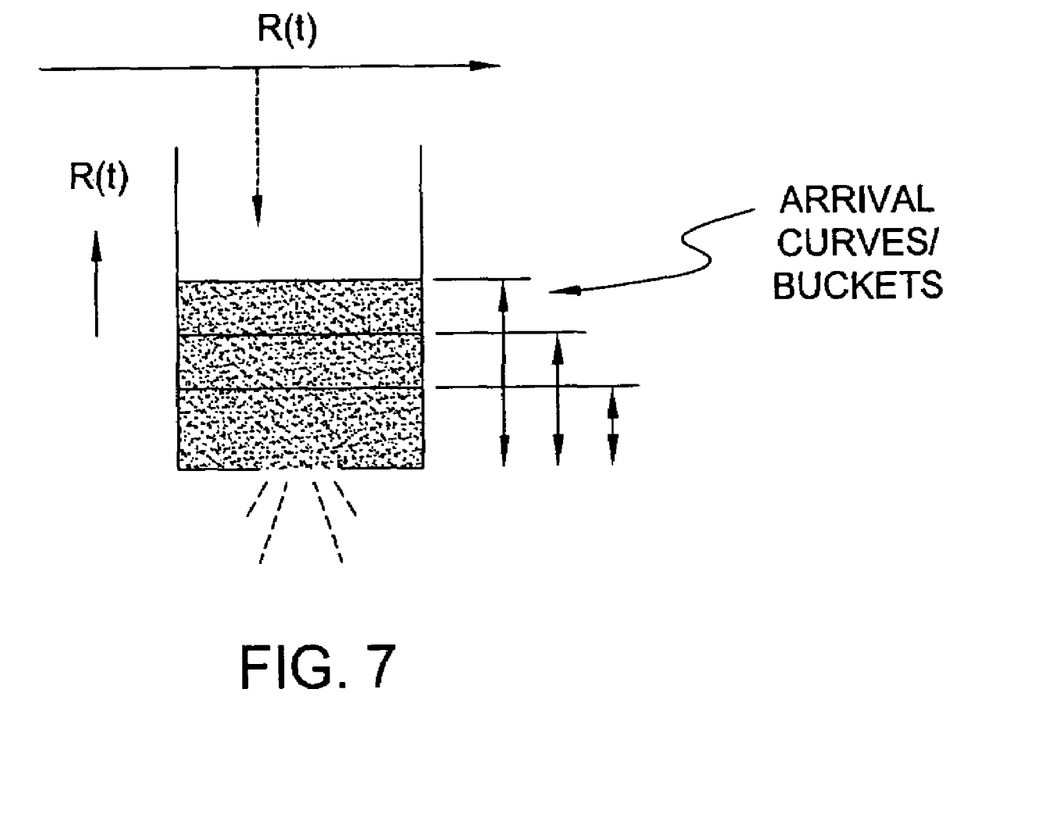
FIG. 7 depicts a high level block diagram of an embodiment of the multiple arrival curve concept of the present invention applied in a leaky bucket configuration.

As previously mentioned, the multiple arrival curve concept of the present invention may be applied in a leaky bucket configuration. The multiple arrival curve concept of the present invention when applied to a leaky bucket controller implies a variable size bucket (i.e., a bucket providing different depths). For example, FIG. 7 depicts a high level block diagram of an embodiment of the multiple arrival curve concept of the present invention applied in a leaky bucket configuration. In the leaky bucket configuration of FIG. 7, there is a pool (bucket) of fluid size, b. The bucket is initially empty but has a hole and leaks at a rate of "r" units of fluids when non-empty. The data from the flow, R(t), has to pour into the bucket an amount of fluid equal to the amount of data. Data that causes the bucket to overflow is defined as non-conforming. each bucket depth varies from the other by a factor of fixed tolerance. Similar to the multiple arrival concept where each arrival curve is separated from the other by a factor of L, a token bucket application of the present invention may be considered a family of token buckets, where each bucket offers a fixed tolerance or bucket size. In the present invention as depicted in FIG. 7, arriving cells may be defined as conforming or non-conforming, and the non-conforming cells may be further prioritized and ordered according to a degree of non-conformance using the family of buckets in accordance with the embodiment of the present invention depicted in FIG. 7.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for enforcing a transmission control parameter for a virtual connection including multiple cells within an input port, the virtual connection having a nominal inter-cell arrival rate increment, wherein the multiple cells are associated with a theoretical arrival time and an early arrival limit, said method comprising:

delineating a lower boundary of a conformance zone for said transmission control parameter by determining a difference between the early arrival limit and the theoretical arrival time;

defining a plurality of early arrival curves for said transmission control parameter, each of said early arrival curves below said lower boundary of said conformance zone;

determining an actual arrival time for an incoming cell from said multiple cells;

comparing said actual arrival time to said theoretical arrival time to determine whether said actual arrival time is later or earlier than said theoretical arrival time;

in response to determining that said actual arrival time is later than said theoretical arrival time, identifying said incoming cell as conforming to said transmission control parameter;

in response to determining that said actual arrival time is earlier than said theoretical arrival time, comparing said actual arrival time to said lower boundary to determine whether or not said actual arrival time is later than said lower boundary of said conformance zone;

in response to determining that said actual arrival time is later than said lower boundary of said conformance zone, identifying said incoming cell as conforming to said transmission control parameter; and in response to determining that said actual arrival, time is earlier than said lower boundary of said conformance zone, identifying said incoming cell as non-conforming to said transmission control parameter and prioritizing said non-conforming cell using said early arrival curves defined for said transmission control parameter.

2. The method of claim 1, further comprising:

in response to identifying an incoming cell as conforming to said transmission control parameter, resetting said theoretical arrival time to said actual arrival time.

3. The method of claim 1, wherein the theoretical arrival time of a next arriving cell is determined by adding said nominal inter-cell arrival rate increment to said determined actual arrival time of a directly preceding cell.

4. The method of claim 1, wherein it is determined if a cell is non-conforming with respect to said lower boundary of said conformance zone by adding the early arrival limit to said actual arrival time of said cell and comparing if the sum of the early arrival limit and the actual arrival time of said cell is greater than or less than said theoretical arrival time for said cell.

5. The method of claim 4, wherein said cell is identified as a non-conforming cell with respect to said lower boundary of said conformance zone if the sum of the early arrival limit and the actual arrival time of said cell is less than the theoretical arrival time for said cell.

6. The method of claim 4, wherein said cell is identified as a conforming cell with respect to said lower boundary of said conformance zone if the sum of the early arrival limit and the actual arrival time of said cell is greater than the theoretical arrival time for said cell.

7. The method of claim 1, wherein said method comprises a virtual scheduling algorithm.

8. The method of claim 1, wherein said method comprises a continuous-state Leaky Bucket algorithm.

9. The method of claim 1, wherein said method comprises a token-bucket algorithm.

10. An apparatus comprising a memory and a processor for enforcing a transmission control parameter for a virtual connection including multiple cells within an input port, the virtual connection having a nominal inter-cell arrival rate increment, wherein the multiple cells are associated with a theoretical arrival time and an early arrival limit, said apparatus adapted to perform the steps of:

delineating a lower boundary of a conformance zone for said transmission control parameter by determining a difference between the early arrival limit and the theoretical arrival time;

defining a plurality of early arrival curves for said transmission control parameter, each of said early arrival curves below said lower boundary of said conformance zone;

determining an actual arrival time for an incoming cell from said multiple cells;

comparing said actual arrival time to said theoretical arrival time to determine whether said actual arrival time is later or earlier than said theoretical arrival time;

in response to determining that said actual arrival time is later than said theoretical arrival time, identifying said incoming cell as conforming to said transmission control parameter;

in response to determining that said actual arrival time is earlier than said theoretical arrival time, comparing said actual arrival time to said lower boundary to determine whether or not said actual arrival time is later than said lower boundary of said conformance zone;

in response to determining that said actual arrival time is later than said lower boundary of said conformance zone, identifying said incoming cell as conforming to said transmission control parameter; and in response to determining that said actual arrival time is earlier than said lower boundary of said conformance zone, identifying said incoming cell as non-conforming to said transmission control parameter and prioritizing said non-conforming cell using said early arrival curves defined for said transmission control parameter.

11. A system for enforcing a transmission control parameter for virtual connections including multiple cells within respective input ports of a plurality of network nodes, the virtual connections having a nominal inter-cell arrival rate increment, wherein the multiple cells are associated with a respective theoretical arrival time and an early arrival limit for each of said network nodes, said system comprising:

at least one processing unit including a processor and a memory, adapted to respectively perform the steps of:

delineating a lower boundary of a conformance zone for said transmission control parameter by determining a difference between the early arrival limit and the theoretical arrival time;

defining a plurality of early arrival curves for said transmission control parameter, each of said early arrival curves below said lower boundary of said conformance zone;

determining an actual arrival time for an incoming cell from said multiple cells;

comparing said actual arrival time to said theoretical arrival time to determine whether said actual arrival time is later or earlier than said theoretical arrival time;

in response to determining that said actual arrival time is later than said theoretical arrival time, identifying said incoming cell as conforming to said transmission control parameter;

in response to determining that said actual arrival time is earlier than said theoretical arrival time, comparing said actual arrival time to said lower boundary to determine whether or not said actual arrival time is later than said lower boundary of said conformance zone;

in response to determining that said actual arrival time is later than said lower boundary of said conformance zone, identifying said incoming cell as conforming to said transmission control parameter; and in response to determining that said actual arrival time is earlier than said lower boundary of said conformance zone, identifying said incoming cell as non-conforming to said transmission control parameter and prioritizing said non-conforming cell using said pluralities of early arrival curves defined for said transmission control parameter.

12. The system of claim 11, wherein each of said network nodes comprises a respective processing unit.

13. A computer readable medium storing a software program, that, when executed by a computer, causes the computer to perform a method for enforcing a transmission control parameter for a virtual connection comprising multiple cells within an input port, said virtual connection having a nominal inter-cell arrival rate increment, wherein said multiple cells are associated with a theoretical arrival time and an early arrival limit, said method comprising:

delineating a lower boundary of a conformance zone for said transmission control parameter by determining a difference between the early arrival limit and the theoretical arrival time;

defining a plurality of early arrival curves for said transmission control parameter, each of said early arrival curves below said lower boundary of said conformance zone;

determining an actual arrival time for an incoming cell from said multiple cells;

comparing said actual arrival time to said theoretical arrival time to determine whether said actual arrival time is later or earlier than said theoretical arrival time;

in response to determining that said actual arrival time is later than said theoretical arrival time, identifying said incoming cell as conforming to said transmission control parameter;

in response to determining that said actual arrival time is earlier than said theoretical arrival time, comparing said actual arrival time to said lower boundary to determine whether or not said actual arrival time is later than said lower boundary of said conformance zone;

in response to determining that said actual arrival time is later than said lower boundary of said conformance zone, identifying said incoming cell as conforming to said transmission control parameter; and in response to determining that said actual arrival time is earlier than said lower boundary of said conformance zone, identifying said incoming cell as non-conforming to said transmission control parameter and prioritizing said non-conforming cell using said early arrival curves defined for said transmission control parameter.

* * * * *